UNITED STATES PATENT OFFICE.

ALEXANDER CRUMBIE, OF NYACK, ASSIGNOR OF ONE-HALF HIS RIGHT TO DAVID DONALD, OF BROOKLYN, NEW YORK.

IMPROVEMENT IN BAKERS' OVENS.

Specification forming part of Letters Patent No. 175,042, dated March 21, 1876; application filed February 16, 1876.

*To all whom it may concern:*

Be it known that I, ALEXANDER CRUMBIE, of Nyack, in the county of Rockland and State of New York, have invented certain new and useful Improvements in Bakers' Ovens; and I do hereby declare that the following is a full, clear, and exact description of the same, reference being had to the accompanying drawing, which forms part of this specification.

This invention relates to bakers' ovens in which the bread or substance to be baked is placed on trays having a longitudinal or endless travel within the oven. It is in no wise restricted to the manner of heating the oven, which may either be direct or indirect, and the heated air or gases be introduced above, below, or otherwise; but the invention consists in a peculiar and intermittent action of a series of endless traveling pans or trays, in which the latter move in courses, one above the other, but at different periods as regards their upper and lower travels, and so that each tray successively falls and rises at the opposite ends of its longitudinal courses of travel, to bring it in line with the successively-moving upper and lower sets of trays, whereby every facility is afforded for the entry and removal of the bread, ample time given for the baking of the latter, and the necessary power or labor to work a continuous series of trays is reduced.

The invention also consists in various novel means, or combinations of means, whereby the above-described action of the trays is obtained in a smooth, practicable, and durable manner. It also includes a sectionally-constructed tray-carrying track or tracks, the end sections of which are made to rise and fall, likewise a connection of the front rising and falling track-sections with the door or gate that controls the opening through which the bread or substance to be baked, or which has been baked, is introduced or removed, whereby said gate or door is opened and closed, or either, in timely relation with the trays. This feature of the invention, however, may be omitted, and the door be independently worked by hand or otherwise.

Figure 1:
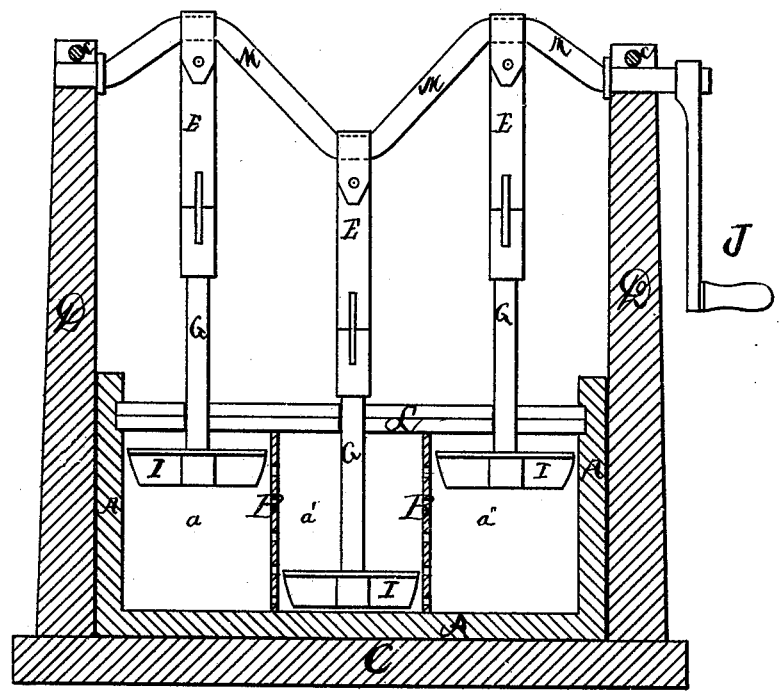
Figure 2:
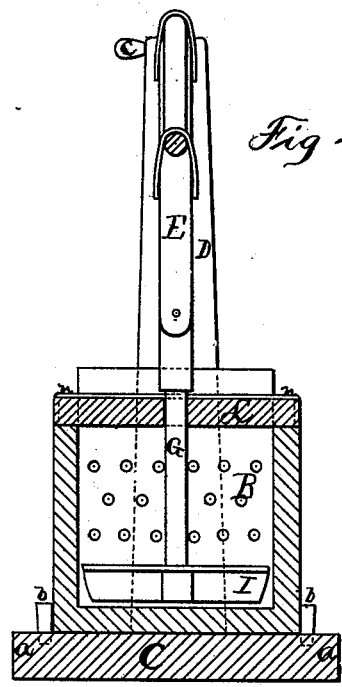
Figure 3:
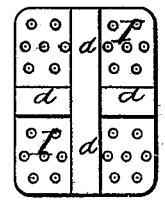

In the accompanying drawing, Figures 1 and 2 represent side elevations of the oven, with the operating mechanism in different working positions. Fig. 3 is a longitudinal vertical section taken immediately within the nearest side wall of the oven, and with the working parts in the position represented in Fig. 1. Fig. 4 is a central longitudinal vertical section, with the working parts in the position represented in Fig. 2.

A is the baking-chamber of the oven, and B C its furnace and ash-pit doors. D is the opening through which the bread is introduced to and removed from the oven, and E the gate or door thereof, here shown as arranged within the baking-chamber, and as having an up-and-down motion to control said opening. Affixed to the interior of the opposite side walls of the baking-chamber A are upper and lower main track-sections, $G\ G^1$, along or on which, and along or on end rising and falling track-sections $G^2\ G^3$, a series of independent bread or baking trays, H, travel by means of wheels $b$, with which said trays are provided.

These trays, of which there may be any number arranged one behind the other, as the oven may be of an indefinite length, have a peculiar and intermittent action, which may be termed "endless," inasmuch as they travel alternately and intermittently in opposite directions on or along the upper and lower fixed track-sections $G\ G^1$, and the rising and falling end track-sections $G^2\ G^3$, as the latter, carrying a tray on them, are brought into line with the main or fixed track-sections $G\ G^1$. The two end track-sections $G^2\ G^3$ rise and fall simultaneously.

It is immaterial whether the trays advance toward the front of the baking-chamber, having the opening D in their upper or lower courses of travel; but they will here be described as so moving in their upper course of travel. Thus, the door E being closed, as shown in Fig. 4, and the end track-sections $G^2\ G^3$ being raised so as to be in line with the upper fixed track-sections G, the upper series of trays H move forward collectively, while the lower series of trays H remain stationary on the lower fixed track-sections $G^1$ until the The cams M N are suitably shaped and set in proper relation with each other to give to the trays, by the means just described, their intermittent longitudinal and rising and falling motions in regular order, or in such timely relations as have hereinbefore been described.

I claim—

1. The combination, in a baking-oven, of an endless series of pans or trays, and mechanism applied to communicate to said trays an intermittent travel in upper and lower courses, and in opposite directions alternately, and to give a simultaneous rising and falling motion alternately to the end trays in the series, substantially as specified.

2. The combination, with the endless series of independent traveling pans or trays H, of the upper and lower fixed tracks $G G^1$, and the sectional rising and falling end tracks $G^2 G^3$, essentially as and for the purpose herein set forth.

3. The combination, with the front-end rising and falling track-sections $G^2$, of the gate or door E, which controls the mouth or opening D of the baking-chamber, substantially as specified.

4. The combination of the revolving cams M N, the levers O T, with their opposite attachments or rollers $g\ l$, the cross-shafts J K L, the cranks $Q\ A^2$, and their connecting-rods $P\ n\ s$, the double-armed or two-armed loose lever U, crank $A^1$, and connecting-rod $r$, the cranks or levers R $B^1\ B^2$, the longitudinally-moving sliding bars S, with their attached drivers $k\ k$, and the slides $C\ C^1$, with their attached rising and falling end track-sections $G^2\ G^3$, for operation in concert with the endless series of independent pans or trays H, essentially as described.

ALEXANDER CRUMBIE.

Witnesses:
FRED. HAYNES,
BENJAMIN W. HOFFMAN.

J. C. DAMAN.
CHURN.

No. 175,043. Patented March 21, 1876.

WITNESSES
Mary J. Utley.
E. H. Bates

INVENTOR.
James C. Daman.
Chipman Hosmer & Co.
ATTORNEYS.